A. JENSEN.
ART OF MANUFACTURING ARTIFICIAL MONOLITHS.
APPLICATION FILED FEB. 18, 1910.

1,050,946. Patented Jan. 21, 1913.

Witnesses:
Horace A. Crosman
Arthur E. Carson

Inventor:
Andrew Jensen
by Emery & Booth
Attys.

UNITED STATES PATENT OFFICE.

ANDREW JENSEN, OF NATICK, MASSACHUSETTS.

ART OF MANUFACTURING ARTIFICIAL MONOLITHS.

1,050,946.

Specification of Letters Patent.

Patented Jan. 21, 1913.

Application filed February 18, 1910. Serial No. 544,668.

*To all whom it may concern:*

Be it known that I, ANDREW JENSEN, a citizen of the United States, and a resident of Natick, in the county of Middlesex, State of Massachusetts, have invented an Improvement in the Art of Manufacturing Artificial Monoliths, of which the following description, in connection with the accompanying drawings, is a specification, like letters on the drawings representing like parts.

This invention relates to the art of manufacturing artificial monoliths comprising stony ingredients concorporated with a fluxive or binding substance and among other objects aims to produce a hard dense facing.

Figure 1:
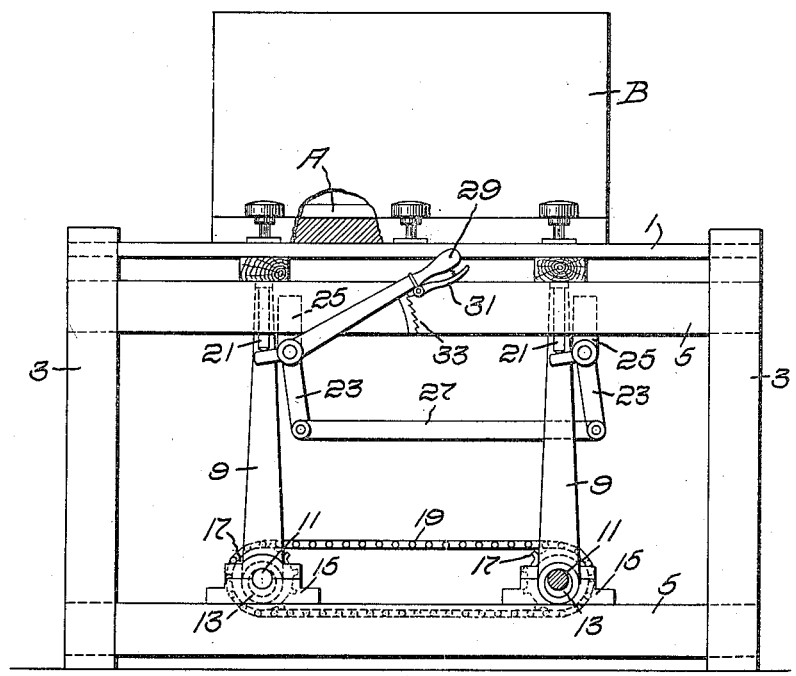
Figure 2:
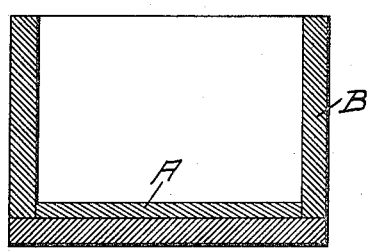

The character of the invention may be best understood by reference to the following description of an illustrative method of manufacture when taken in connection with the accompanying drawing wherein:

Figure 1 is a side elevation of vibrator and mold which may be used in the method embodying the invention; and Fig. 2 is a vertical section of a mold and plate which may be used in the method.

In the manufacture of monoliths as concrete blocks or other forms, it is very desirable to produce a block or other form having a hard, dense surface layer or surface which will not crack; which will effectually resist the attacks of the weather and which will have a finished and attractive appearance. By the method which I will now describe embodying my invention a block or other form may be made having the above and other qualities.

In carrying out my method a thin layer of wet fluxive wet concrete mixture is placed on a surface of a form or pattern which may vary according to the nature of face it is desired to produce. If, for example, flat, smooth surfaces are desired the mixture is placed on a flat plate such as A which preferably should be of hard, nonporous material and should hold its shape without warping or distortion. A steel plate or galvanized iron plate is found to be very satisfactory but I prefer to use for this purpose a thin cement plate as is made by this method as more fully hereinafter described. When this thin cement plate is used for this purpose it may be reinforced with metal lathing or expanded metal if desired. The plate or other surface used may be covered with an insulation coating of tallow, suet of beef or other lubricant to fill any pores which might be present in said surface and prevent the water or other ingredients of the mixture from entering said pores and to provide a surface which will enable the removal of the layer from said plate to be readily effected at the later stage in the process, as more fully hereinafter described.

It is found in practice that excellent results are obtained from a wet concrete mixture comprising one part of cement to two parts of gravel or crushed stone of a size which may vary and may depend somewhat on the thickness of the layer to be used. It is not necessary to distribute the wet concrete mixture carefully and evenly on the plate but it will suffice to distribute small quantities of said mixture at random on the plate. The wet mixture having been placed on the plate the latter is then vibrated causing the mixture to spread evenly over said plate with a substantially uniform thickness. It will be understood that the mixture preferably is not confined at the edges of the plate but is free to distribute itself on the latter and the thickness of the layer will be determined somewhat by the consistency of the mixture and the time of vibration of the plate. The vibration of the latter will cause the heavier particles in the mixture to tend to settle to the bottom of the layer and into close contact with the surface of said plate and cause the finer particles to work their way through said heavier particles, and the finest particles, being of cement, will come into intimate contact with said surface, thereby bringing a layer of practically pure cement to said surface. At the same time the water in the mixture will tend to rise up through the layer to the surface thereof. The best concrete is obtained if there is sufficient water in this mixture so that when the plate is vibrated the water will rise to the surface clear and without carrying slimes or particles with it. The settling of the particles into close contact with said plate and with each other will, of course, drive out air as well as water and prevent the inclusion in said layer of interstices or air pockets. As the layer is thin it is necessary to vibrate the plate only for a very short time in order to drive out the air and water sufficiently, a vibration for about thirty seconds being usually sufficient.

The plate may be vibrated by any suitable mechanism or device. Herein referring to Fig. 1 of the drawing a vibrator is provided comprising a vibratory table 1 guided in a frame consisting of upright posts 3 connected by upper and lower horizontal joists 5. Said table is supported on the tops of posts 9, loosely mounted at their lower ends on shafts 11 and guided in apertures in said joists. Said posts may be vibrated vertically by eccentrics 13 fast on said shafts and journaled in bearings 15 secured to the lower horizontal joists 5. To rotate the shafts 11 simultaneously, the latter may be provided with sprocket wheels 17 fast on said shafts and connected by a suitable sprocket chain 19, one of said shafts being provided with a suitable driving pulley (not shown). It will be apparent that when said shafts 11 are rotated the posts 9 will be vibrated vertically and transmit vibratory movements to the table 1. To lift the table from its seat on said vibratory posts 9, suitable lifting pins 21 may be set in vertical holes in the upper joists 5 and may be lifted into engagement with the table undercleats 7 by bell crank levers 23 fulcrumed on brackets 25 depending from one of said joists 5. The short arms of said bell cranks engage the lower ends of said pins, while their long arms are connected by a link 27 so that they may be simultaneously rocked to lift the table evenly as desired. To rock said bell cranks and hold the same in position, a handle 29 is secured to, or may be integral with, one of said cranks and may be held in its positions of adjustment by a spring pressed dog 31 on said handle cooperating with a ratchet 33 secured to one of said joists 5. The plate or mold to be vibrated may be guided and held in place on the table by suitable guide rollers 35 on studs 37 projecting upwardly from said table.

In practice the plate is preferably positioned on the vibrator (Fig. 1) and then the wet concrete mixture is placed on the plate. After the plate has been sufficiently vibrated as described, it is removed from the vibrator and set aside or placed in a suitable rack, whereupon some of the water or moisture which has accumulated on the surface of said layer will go back into the mixture to crystallize the cement and some of the water will evaporate. As a result the layer stiffens somewhat. The vibration of the layer as described will drive out the air from between the layer and the plate to such an extent that the layer will lie in intimate contact with said plate, the atmospheric pressure on the surface of said layer contributing to its retention on said plate. In fact, the layer sticks so closely to said plate that said layer and plate may be roughly moved about without liability of one separating from another. If it is desired to use the layer for slabs or tiles it is now permitted to harden, but if it is desired to use the layer for a facing of a block, wall or other form the layer is not permitted to become hard but is allowed to stand for a short period such as fifteen or twenty minutes, the period varying according to the conditions, until the water on the surface of the layer has disappeared. If, for example, it is desired to apply the layer to blocks, the plate with its layer still on it may be placed again in the vibrator and in a mold or flask of any suitable description, herein shown as a flask B. Then a concrete mixture is filled into the mold on top of said layer to constitute the body of the block and the table is again vibrated for a short period, a time of about sixty seconds being ordinarily sufficient to settle or pack the particles of the body of the block and effect the adhesion of the latter to said layer or veneer.

In practice the mixture forming the body of the block or backing for the layer may consist of one part cement, two parts sand and three parts crushed stone or gravel, although any good concrete mixture might be used. The body mixture should be moist, but considerably drier and stiffer than the mixture used in making the surface layer, said body being sufficiently stiff if somewhat harder than ordinary mortar. After the body and veneer have been vibrated together as described, the plate and flask may be slid or otherwise removed from the vibratory table and the flask may be removed at once from the block or other form which may then be placed aside to harden. The hardening may be accelerated if desired by steaming, as by placing the block in a steaming room. The plate must remain on the block until the latter has hardened. The plate may be then pulled off of said block leaving the plate perfectly clean and without any portion of the facing of the block adhering thereto. The insulation coating previously referred to which was spread on said plate and the hardness and denseness of the facing layer contribute to this result. The face of the block thus made is extremely hard and dense throughout and presents a very finished and attractive appearance. The face of the block requires no further finishing but is complete and ready for use. It is found that this hard facing does not crack but maintains a smooth and continuous surface. Probably one of the reasons for this is the fact that in vibrating the wet layer on the plate the particles settle closely together and to the surface of said plate so that they have a strong adherence enabling them to effectually resist shrinkage and cracking. A veneer made by the process described is so hard, dense and smooth that as stated above it constitutes an excellent plate for producing other hard facings.

It will be apparent from the above described steps that but one of the faces of the block is given a hard, smooth facing. However, as many faces of the block as desired may be given such facings. If, for example, it is desired to provide two such faces, a layer of the wet mixture is placed on a plate, vibrated and set aside as before. A layer of the mixture is then placed on another plate and vibrated as before. The former plate with its layer adhering thereto is then set on edge in the flask with the plate against one side of the flask, and the mixture for the body of the block is filled in and vibrated and the flask removed thereby forming a block having two hard facings. Other hard faces may be made in a similar manner. When side facings are being made the layer should be of a thinness sufficient to permit it to remain on the plate when the latter is set on edge in the mold. The adjoining sides of the veneers may be smoothed or beveled off to form a clean mortised joint if desired. The hard surface may be given an ornate appearance simulating marble and graining or other color effects by placing splotches, lines or streaks of color on the surface of the plate. When the layer of the wet mixture is vibrated into close adherence to said plate the colors may be spread or be diffused causing them to blend and present very pleasing ornamental effects. The suet, tallow or other insulation coating may be of a nature to affect the appearance of the surface. For example, when suet is used it is found that when the plate is removed the surface has a sort of sheen or polished appearance. It will be understood that the hard layer of veneer may be applied to various uses such as interior and exterior walls, solid walls having a finished surfacing on their outer and inner sides, ceilings, floors, walks and tiles. Rough stone or other surfaces may be imitated with absolute accuracy due to the close conformity of the layer to the surface or pattern imitated, had by the settling of the particles thereto under the vibration of the layer, as described. A block or other form having a layer such as is made by the process described herein is more lasting, durable and permanent than any other known to me.

In making an entire wall in one mold a layer or layers of the wet mixture are vibrated and allowed to stand a short time as before and the plates are then placed in the mold. The concrete mixture constituting the body of the wall is then filled in, but in this case the body of the wall would be tamped into close adherence with said layer. The plate or plates would remain on the wall until after the latter has hardened, the plate being removed when the mold is removed.

Having described the illustrative method embodying my invention, what I claim as new and desire to secure by Letters Patent is:

Claims.

1. An improvement in the art of manufacturing artificial monoliths characterized by placing a sheet-like layer of fluxive concrete mixture of solid and liquid constituents including cement on a surface; and vibrating the same a sufficient length of time to bring a layer of practically pure cement to said surface.

2. An improvement in the art of manufacturing artificial monoliths characterized by placing on a mold a fluxive concrete mixture of liquid and solid constituents including cement, the latter having a fineness greater than that of any of the other solid constituents; and vibrating the mixture to settle cement to the face of the mold to provide a face closely simulating the character of the face of the mold.

3. An improvement in the art of manufacturing artificial monoliths characterized by placing a sheet-like layer of fluxive concrete mixture of solid and liquid ingredients including cement on a surface; agitating the same a sufficient length of time to bring a layer of practically pure cement to said surface; and then uniting the latter to a backing.

4. An improvement in the art of manufacturing artificial monoliths characterized by placing a sheet-like layer of fluxive concrete mixture of solid and liquid ingredients, including cement, on a surface; agitating the same a sufficient length of time to bring a layer of practically pure cement to said surface; and uniting the latter to a backing of concrete mixture while both are adhesive.

5. An improvement in the art of manufacturing artificial monoliths characterized by placing a sheet-like layer of fluxive concrete mixture of solid and liquid ingredients, including cement, on a surface; agitating the same a sufficient length of time to bring a layer of practically pure cement to said surface; and then uniting the latter to a backing of concrete mixture of a different character while both are adhesive.

6. An improvement in the art of manufacturing artificial monoliths characterized by placing a sheet-like layer of fluxive concrete mixture of solid and liquid ingredients, including cement, on a surface, agitating the same a sufficient length of time to bring a layer of practically pure cement to said surface; and uniting said layer while on said surface to a backing of concrete mixture while said layer and backing are adhesive.

7. An improvement in the art of manufacturing artificial monoliths characterized by placing on a lubricated surface a fluxive concrete mixture of solid and liquid constituents of a consistency to readily spread over said surface; agitating the mixture to drive liquid and air therefrom and settle the solid constituents until a layer is formed sufficiently thin to be retained by atmospheric pressure on said surfaces in any position of the latter.

8. An improvement in the art of manufacturing artificial monoliths which is characterized by placing a thin layer of wet concrete mixture on a surface, vibrating the latter to drive air and water from said mixture, leaving the latter to stiffen somewhat, placing the plate with its layer in a mold, filling a concrete mixture thereon, vibrating the plate and mold and leaving the molded form to harden.

9. A method of making forms of concrete characterized by placing a thin layer of wet concrete mixture on the surface of a plate, vibrating the latter to drive air and water from said mixture, leaving the latter to stiffen somewhat, placing and vibrating another layer on another plate, placing one of said plates on a side of a mold and the other on the bottom of said mold, filling the mold with a concrete mixture, vibrating the whole and then removing the mold and permitting the molded form to harden.

10. A method of making forms of concrete characterized by placing a layer of wet concrete mixture on a surface, vibrating the latter to drive air and water from said mixture, leaving the latter to stiffen somewhat, placing the surface with its layer in a mold, filling the latter with a concrete mixture, vibrating the whole and then removing the mold and leaving the molded form to harden.

11. A method of making forms of concrete characterized by placing on a plate a layer of wet concrete mixture comprising one part cement and two parts of gravel or crushed stone, vibrating said plate to drive air and water from said layer then leaving the latter to stiffen somewhat, placing the plate with its layer in a mold; filling the latter with a moist concrete mixture comprising one part cement, two parts sand and three parts crushed stone or gravel; vibrating the whole and removing the mold and leaving the molded form to harden.

12. A method of making forms of concrete characterized by placing on a pattern a layer of wet concrete mixture comprising two parts of stony ingredients to one part of binding substance, vibrating the layer to drive air and some of the water from said mixture, leaving the latter to stiffen somewhat, placing the pattern with its layer in a mold; filling the latter with a moist mixture comprising two parts sand, three parts stony ingredients and one part cement; vibrating the pattern and mold and leaving the molded form to harden.

13. A method of making forms of concrete characterized by placing a layer of wet concrete mixture on a plate, vibrating the latter to drive air and water from said mixture, permitting the latter to stiffen somewhat; placing the plate into a mold, filling the latter with a body of concrete mixture drier than said layer mixture; vibrating the mold and then leaving the molded form to harden.

14. An improvement in the art of manufacturing artificial monoliths characterized by placing a coating of suet of beef on a pattern, placing a layer of wet concrete mixture on said pattern, vibrating the layer to settle the mixture on said pattern and drive air and water from said mixture; after an interval of a few minutes placing the layer and pattern in a mold, filling the latter with a concrete mixture, vibrating said pattern and mold and then permitting the form thus made to harden.

15. An improvement in the art of manufacturing artificial monoliths characterized by arranging a color or colors on a pattern; placing a layer of wet concrete mixture on the latter; vibrating said pattern to settle the layer intimately in contact with said pattern and spread said color or colors, and then permitting the mixture to harden.

16. An improvement in the art of manufacturing artificial monoliths characterized by arranging a color or colors on a pattern or plate to simulate graining or marble, placing a layer of wet concrete mixture on said pattern or plate, vibrating the latter to drive air and some of the water from said mixture to settle the particles of the latter into intimate engagement with said pattern or plate and then permitting the mixture to harden.

17. A method of making forms of concrete characterized by covering a pattern with an insulation coating, arranging colors thereon, placing a layer of wet concrete mixture on said pattern, vibrating the latter to drive out air and some of the water from said mixture and settle the particles of the latter into intimate engagement with said pattern, permitting the mixture to stiffen somewhat; then introducing said pattern and layer into a mold, filling the latter with a moist concrete mixture, vibrating the mold and pattern and then removing the mold and permitting the form thus made to harden.

18. A method of making forms of concrete characterized by placing a wet layer of concrete mixture on a pattern or plate, vibrating the latter for about thirty seconds, then after a few minutes have elapsed placing the pattern or plate in a mold, filling a concrete mixture in the latter, vibrating the mold and pattern or plate for about sixty seconds and then removing the mold and permitting the form thus molded to harden.

19. A method of casting concrete walls characterized by placing a layer of wet concrete mixture on a plate, vibrating the latter to drive air and some of the water therefrom, placing the plate with its layer in a mold after said layer has stiffened somewhat; filling the mold with a concrete mixture, tamping down the latter and then removing said plate and mold after said mixture has set.

20. An improvement in the art of manufacturing artificial monoliths which is characterized by agitating a thin layer of fluxive material comprising liquid and solid constituents to settle the solid constituent; uniting said layer to a backing while said layer and backing are adhesive and then steaming the monolith thus formed.

21. An improvement in the art of manufacturing artificial monoliths characterized by placing on a lubricated surface a body of fluxive concrete mixture of solid and liquid constituents including cement; and vibrating the same to bring a layer of the cement to said surface.

In testimony whereof, I have signed my name to this specification, in the presence of two subscribing witnesses.

ANDREW JENSEN.

Witnesses:
　HENRY T. WILLIAMS,
　ROBERT H. KAMMLER.